United States Patent
Garcia Jurado Suarez et al.

(10) Patent No.: US 8,438,288 B2
(45) Date of Patent: *May 7, 2013

(54) DEVICE-PAIRING BY READING AN ADDRESS PROVIDED IN DEVICE-READABLE FORM

(75) Inventors: Carlos Garcia Jurado Suarez, Redmond, WA (US); Curtis N. von Veh, Redmond, WA (US); Darko Kirovski, Kirkland, WA (US); Christopher A. Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 595 days.

This patent is subject to a terminal disclaimer.

(21) Appl. No.: 12/706,718

(22) Filed: Feb. 17, 2010

(65) Prior Publication Data

US 2011/0202427 A1 Aug. 18, 2011

(51) Int. Cl.
*G06F 15/16* (2006.01)

(52) U.S. Cl.
USPC ........... 709/227; 709/203; 709/225; 709/238; 726/12

(58) Field of Classification Search .................. 709/203, 709/225, 227, 228, 220, 238, 245; 705/50, 705/64; 726/12, 15, 1; 235/380
See application file for complete search history.

(56) References Cited

U.S. PATENT DOCUMENTS

| | | | |
|---|---|---|---|
| 6,269,404 B1 * | 7/2001 | Hart et al. | 709/245 |
| 6,330,562 B1 * | 12/2001 | Boden et al. | 709/220 |
| 6,754,708 B1 * | 6/2004 | Sabatier et al. | 709/227 |
| 7,149,805 B2 | 12/2006 | Bartolome et al. | |
| 7,194,438 B2 * | 3/2007 | Sovio et al. | 705/50 |
| 7,194,690 B2 | 3/2007 | Guillermo et al. | |
| 7,784,684 B2 * | 8/2010 | Labrou et al. | 235/380 |
| 8,214,890 B2 * | 7/2012 | Kirovski et al. | 726/12 |
| 2004/0097217 A1 | 5/2004 | McClain | |

(Continued)

FOREIGN PATENT DOCUMENTS

| | | |
|---|---|---|
| EP | 1253500 A1 | 10/2002 |
| EP | 1578093 A1 | 9/2005 |
| WO | 2007071009 A1 | 6/2007 |

OTHER PUBLICATIONS

International Search Report and Written Opinion for PCT/US2011/023819, corresponding to U.S. Appl. No. 12/706,718, date of mailing: Oct. 31, 2011, 9 pages.

(Continued)

*Primary Examiner* — Ramy M Osman (57) ABSTRACT

A system is described for allowing a user, operating a trusted device, to remotely log into a server via a potentially untrustworthy client. The system operates by establishing a first secure connection between the client and the server. The system then establishes a second secure connection between the device and the server through the client. The user then remotely logs into the server over the second secure connection using the device. The second secure connection is tunneled within the first secure connection, preventing the untrustworthy client from discovering personal information associated with the user. According to one feature, prior to forming the second secure connection, the user can establish a pairing relationship with the client by reading an address of the client using any kind of reading mechanism. According to another feature, the device can receive marketing information in the course of a transaction.

20 Claims, 7 Drawing Sheets

U.S. PATENT DOCUMENTS

| | | | |
|---|---|---|---|
| 2004/0253923 | A1 | 12/2004 | Braley et al. |
| 2005/0068190 | A1* | 3/2005 | Krause ............... 340/825.22 |
| 2005/0071282 | A1 | 3/2005 | Lu et al. |
| 2005/0187882 | A1 | 8/2005 | Sovio et al. |
| 2006/0135064 | A1 | 6/2006 | Cho et al. |
| 2006/0136334 | A1 | 6/2006 | Atkinson et al. |
| 2006/0206709 | A1 | 9/2006 | Labrou et al. |
| 2006/0242322 | A1* | 10/2006 | Williams et al. ............ 709/245 |
| 2007/0022058 | A1* | 1/2007 | Labrou et al. .................. 705/67 |
| 2007/0123166 | A1 | 5/2007 | Sheynman et al. |
| 2007/0226484 | A1 | 9/2007 | Pering et al. |
| 2007/0271606 | A1* | 11/2007 | Amann et al. .................. 726/15 |
| 2007/0278289 | A1* | 12/2007 | Kunieda et al. ............... 235/380 |
| 2008/0167000 | A1* | 7/2008 | Wentker et al. ............... 455/408 |
| 2009/0239512 | A1* | 9/2009 | Hammad et al. ............ 455/414.1 |
| 2009/0248580 | A1 | 10/2009 | Baentsch et al. |
| 2009/0288012 | A1* | 11/2009 | Hertel et al. .................... 705/39 |
| 2010/0012715 | A1 | 1/2010 | Williams et al. |
| 2010/0058064 | A1 | 3/2010 | Kirovski et al. |

OTHER PUBLICATIONS

Saxena, "Secure Device Pairing based on a Visual Channel," retrieved at <<http://eprint.iacr.org/2006/050.pdf>>, Proceedings of the 2006 IEEE Symposium on Security and Privacy, 2006, 17 pages.

McCune, et al., "Seeing-is-believing: Using Camera Phones for Human-verifiable Authentication," retrieved at <<http://reports-archive.adm.cs.cmu.edu/anon/2004/CMU-CS-04-174.pdf>>, Technical Report No. CMU-CS-04-174, Carnegie Mellon University, Nov. 2004, 22 pages.

Im, Seunghyun, "Validating Secure Connections between Wireless Devices in Pervasive Computing Using Data Matrix," retrieved at <<http://ieeexplore.ieee.org/stamp/stamp.jsp?arnumber=04505718>>, International Conference on Multimedia and Ubiquitous Engineering, 2008, pp. 186-190.

Kim, et al., "Providing Secure Mobile Device Pairing Based on Visual Confirmation," retrieved at <<http://ieeexplore.ieee.org/stamp/stamp.jsp?arnumber=05157021>>, 13th IEEE International Symposium on Consumer Electronics, May 2009, pp. 676-680.

Tsudik, Gene, "Secure Device Pairing," retrieved at <<http://www.eurecom.fr/teaching/engineering/page40379/file40063.pdf>>, University of California, Irvine, retrieved on Feb. 9, 2010, 50 pages.

Wuest, Candid, "Phishing in the Middle of the Stream, Today's Threats to Online Banking," retrieved at <<http://nortonghost.com/avcenter/reference/phishing.in.the.middle.of.the.stream.pdf>>, Whitepaper, Symantec Security Response, Symantec Corporation, Sunnyvale, CA, 28 pages.

Mannan, et al., "Using a Personal Device to Strengthen Password Authentication from an Untrusted Computer," retrieved at <<http://www.ccsl.carleton.ca/paper-archive/2007/TR-07-11.pdf>>, revised Mar. 2007, Financial Cryptography and Data Security, Lecture Notes in Computer Science, vol. 4886/2008, 21 pages.

Wu, et al., "Secure Web Authentication with Mobile Phones," retrieved at <<http://www.simson.net/clips/academic/2003.sow.pdf>>, DIMACS Workshop on Usable Privacy and Security Software, 2004, 2 pages.

"Secure Logins and Protect Customer Accounts against Online Fraud with Risk-Based Authentication," retrieved at <<http://www.digital-resolve.net/solutions/login_authentication.html>>, retrieved on Jun. 6, 2008, Digital Resolve, Norcross, GA, 2 pages.

Kirovski, et al., "Tunneled TLS for Multi-Factor Authentication," retrieved at <<http://research.microsoft.com/pubs/80471/report.pdf>>, Technical Report MSR-TR-2009-50, Apr. 2009, Microsoft Corporation, Redmond, WA, 12 pages.

McCune, et al., "Seeing-Is-Believing: Using Camera Phones for Human-Verifiable Authentication," Int. J. Security and Networks, vol. 4, Nos. 1/2, 2009, pp. 43-56.

* cited by examiner

DEVICE-PAIRING BY READING AN ADDRESS PROVIDED IN DEVICE-READABLE FORM

BACKGROUND

Many types of online services require a user to perform a log-in procedure to gain access to online information. For example, an online merchant may require a user to first establish an account. That account is commonly associated with a user name and password (and/or other credential information). The online merchant will ask the user to enter valid credential information before gaining access to his or her account.

In such a log-in process, there is a risk that various types of adversaries may gain access to personal information associated with the user. For example, the adversary may learn the secret password or credit card number of the user. The adversary may then exploit the "stolen" information, causing potential harm to the user. Known types of adversarial conduct include phishing attacks, key-logging and spyware attacks, spoofing attacks, cross-site scripting attacks, sniffing attacks, and so on, as well as conventional over-the-shoulder-type eavesdropping attacks. Alternatively, or in addition, a malicious entity may attempt to cause damage to the user's computing resources, e.g., by infecting the user's resources using harmful computer viruses of any type.

To address these challenges, the industry has provided numerous security techniques. These techniques aim, in part, at reducing the risk of unwanted disclosure of personal information in the course of a transaction. The most effective of these techniques satisfy two main objectives. First, an effective technique is successful in thwarting many common modes in which an adversary may exploit a transaction. Second, an effective technique is user-friendly, meaning that the technique does not unduly tax the user by imposing a complicated and burdensome protocol. With respect to these objectives, there remains ample room for improvement in known security techniques.

SUMMARY

According to one illustrative implementation, a computer-implemented method is described for pairing a device with a client. The method includes providing an address of the client in a physical device-readable form. The device (or other agent) reads and interprets the address, and, based thereon, establishes a pairing relationship between the client and the device in an automated manner. The method then involves conducting a transaction via a communication channel between the device and the client.

In one illustrative environment, the above-summarized pairing operation can be performed in conjunction with a secure log-in procedure. In that framework, the device is considered trustworthy, but the client is considered potentially untrustworthy (e.g., as being potentially subject to attack by an adversary). The method involves establishing a first secure connection between the client and a server, the client communicating with the server over a network. The method then entails establishing a second secure connection between the device and the server through the client (based on the pairing relationship that has been automatically established between the device and client). The second secure connection is tunneled within the first secure connection. The method then entails conducting a log-in procedure over the second secure connection channel, enabling the user to gain access to a service provided by the server upon a successful outcome of the log-in procedure.

According to another illustrative aspect, the use of a secure tunneled connection prevents the untrustworthy client from receiving personal information pertaining to the user (at least not in discoverable form). Further, the user is not asked to present a physical credit card (or the like) to an attendant associated with the client. This reduces the risk associated with interaction with the untrustworthy client. The use of the automated pairing operation (based on reading the address in physical device-readable form) allows the user to connect to the client in a user-friendly manner. Thus, this approach achieves the dual goals of providing reliable security without imposing difficult burdens on the user.

According to another illustrative aspect, without limitation, the device-readable form is one or more of: a bar code form; an optical character recognition (OCR) form; a magnetic form; an electromagnetic transponder form, and so on.

According to another illustrative aspect, the device-readable form is implemented as a label placed in proximity to the client. For example, the label can be formed on a housing of the client or on any article associated with the client. Alternatively, or in addition, the device-readable form can be presented on a display interface of the client.

According to another illustrative aspect, the device is a portable device, such as a mobile telephone, a portable computing device, etc. According to one illustrative aspect, the client (which is potentially untrustworthy) is a terminal, e.g., a sales terminal in one case.

According to another illustrative aspect, the client can send information (such as marketing information) to the device. For example, the marketing information can comprise electronic coupons, advertisements, etc. The information can originate from any source. It can include any content, selected based on any factor or combination of factors. And it can be sent in response to any triggering event.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative system for conducting a transaction in a secure manner using a trusted device and an untrustworthy client. Section B describes illustrative methods which explain the operation of the system of Section A. Section C describes illustrative processing functionality that can be used to implement any aspect of the features described in Sections A and B.

This application is related to commonly-assigned and co-pending application Ser. No. 12/198,914, filed on Aug. 27, 2008, entitled, "Login Authentication Using a Trusted Device," naming the inventors of Dark Kirovski and Christopher A. Meeks. The '914 application is incorporated by reference herein in its entirety.

Figure 8:
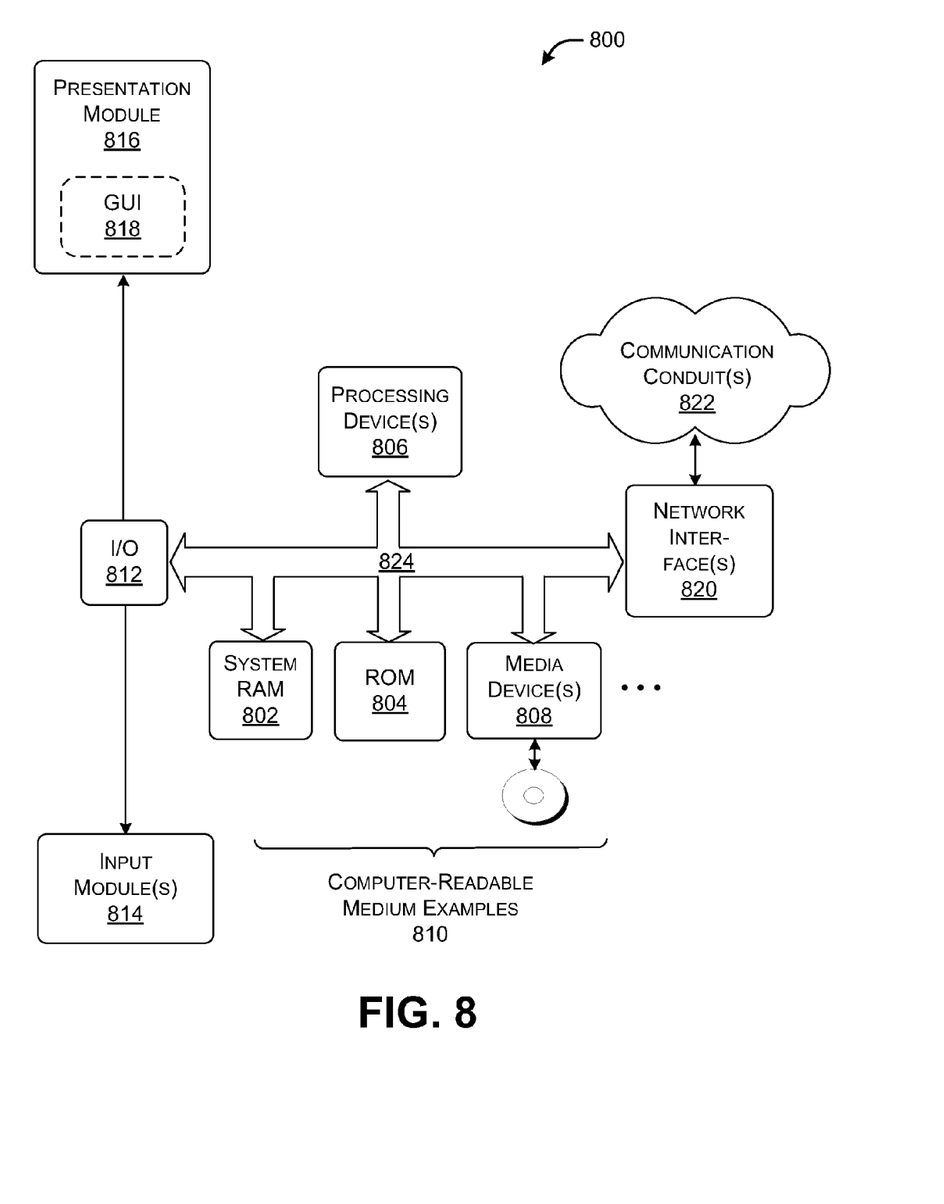
FIG. 8 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 8, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not to be interpreted as an exhaustive indication of features that can be duplicated. Finally, the terms "exemplary" or "illustrative" refer to one implementation among potentially many implementations.

A. Illustrative Systems

Figure 1:
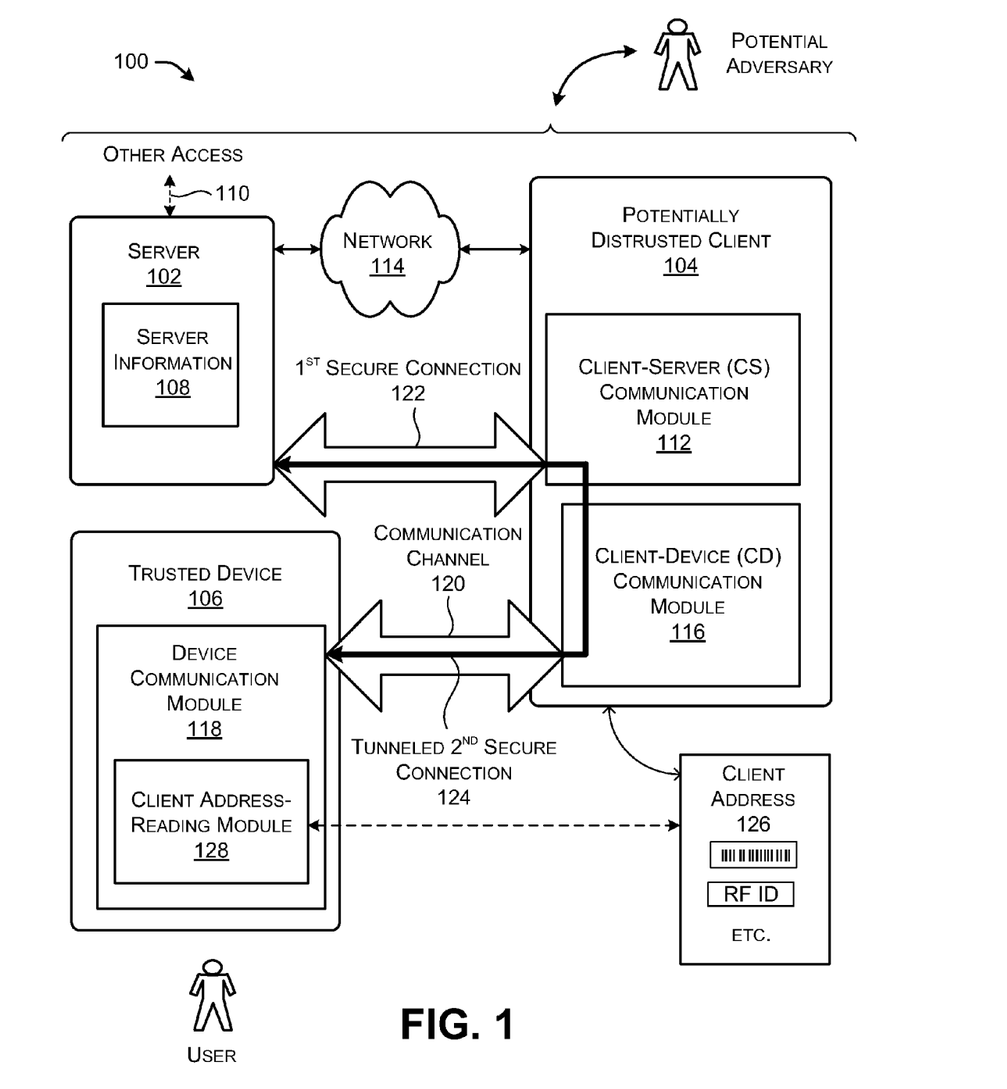
FIG. 1 shows an illustrative system for performing a transaction that involves a log-in procedure.

FIG. 1 shows an illustrative system 100 for performing a transaction. The system 100 includes a server 102, a client 104, and a device 106. By way of overview, a user uses the device 106 to conduct a transaction with the server 102 via the client 104. That transaction may involve a preliminary log-in procedure.

The server 102 can represent any equipment for performing a processing function. For example, the server 102 includes input and output functionality, memory, processing functionality, etc. (not shown). In one illustrative concrete implementation, the server 102 may generally represent one or more computer servers, one or more data stores, routing functionality, and so on, where this equipment can be located at one site or plural sites. In one case, the server 102 is a public resource that is remote from the user, who is operating the device 106. In another case, the server 102 is a private resource, e.g., as maintained by a corporation or other organization (where the user has some affiliation to that organization).

The server 102 can provide any services to the user, such as, without limitation, merchant services, banking services, information-providing services of any type, Email and/or messaging services, social networking services, and so on. Generally, the server 102 may maintain server information 108. The server information 108 may provide any information that can be delivered to the user or is otherwise used in providing services to the user. In one case, the server 102 maintains respective accounts for its users. In this case, the server information 108 may include account information associated with the respective users. In one case, a user may directly interact with the server 102 to set up such an account (e.g., via any appropriate secure or non-secure connection 110), and/or to perform other administrative operations.

The client 104 can represent any equipment for performing a processing function. For example, the client 104 includes input and output functionality, memory, processing functionality, etc. (not shown). The output functionality may include a display interface (not shown) for interacting with the user. In one concrete implementation, the client 104 may represent a terminal, a personal computer, a game console, a set-top box, etc., to which the user has direct or indirect access. The client 104 serves the primary role of facilitating the user's interaction with the server 102. For example, in a merchandising environment (e.g., a store), the client 104 may correspond to a sales terminal; that sales terminal interacts with both the server 102 and the user.

In one implementation, the client 104 includes a client-server (CS) communication module 112 for handling interaction with the server 102. More specifically, the CS communication module 112 can interact with the server 102 via a network 114, such as a wide area network of any type (e.g., the Internet), a local area network of any type, or any combination thereof. In one case, the CS communication module 112 can represent web browsing functionality or the like. The client 104 can also include a client-device (CD) communication module 116 for interacting with the user device 106.

The client 104 can implement the CS communication module 112 and the CD communication module 116 in any manner. In one case, the CS communication module 112 and/or the CD communication module 116 represent application programs that can be downloaded from any appropriate source, for example, from the server 102, a telecommunications entity, a credit card entity or other financial entity, and so on. Alternatively, or in addition, the CS communication module 112 and/or the CD communication module 116 can represent code that is an integral part of the client's code (e.g., its operating system), or code that is manually installed by some agent. Alternatively, or in addition, the CS communication module 112 and/or the CD communication module 116 can be implemented as hardware modules, and so on.

The device 106 can likewise represent any equipment for performing a processing function. For example, the device 106 includes input and output functionality, memory, processing functionality, etc. (not shown). The output functionality may include a display interface (not shown) for interacting with the user. In one concrete implementation, the device 106 can correspond to a portable device, such as, without limitation, a telephone (e.g., any cellular phone, or more specifically, a smart phone), a personal digital assistant (PDA), a tablet-type computing device, a lap-top computer or pocket PC, a game playing device, a music playing device, a book reader device, an intelligent keypad, and so on. Or the device 106 can correspond to a special-purpose portable device that is manufactured to interact with the system 100 of FIG. 1. Or the device 106 may correspond to a generally stationary device, such as a personal computer, etc.

In one implementation, the device 106 includes a device communication module 118 for interacting with the server 102 via the client 104. The device communication module 118 can be implemented in any manner. In one case, the device communication module 118 represents an application program that can be downloaded from any appropriate source, for example, from the server 102, a telecommunications entity, a credit card entity or other financial entity, and so on. Alternatively, or in addition, the device communication module 118 can represent code that is an integral part of the device's code (e.g., its operating system), or code that is manually installed by the user or other agent. Alternatively, or in addition, the device communication module 118 can be implemented as a hardware module, and so on.

The device 106 and the client 104 communicate via a near-field communication channel 120. This communication channel 120 may represent any type of wireless or wired connection, point-to-point or multi-point. Without limitation, in one case, the communication channel 120 represents a Bluetooth connection, a WiFi (802.11) connection, a wired Universal Serial Bus (USB) connection, etc. To facilitate set-up, there is no requirement that this communication channel 120 be implemented as a private and/or authenticated connection.

A potential adversary represents any human and/or automated agent which has an unwanted role in the transaction performed by the user using the system 100. The adversary may act in an active and/or passive manner. Through this unwanted interaction, the adversary can comprise the user's personal information or cause other harm within the system 100. The term personal information has broad connotation as used herein; it encompasses any information associated with the user which he or she does not wish to divulge for any reason. Without limitation, it may include password information, user name information, contact information, account number information, transaction history information, biographical information, and so on.

In one implementation, the client 104 represents the weak link in the system 100, and therefore may serve as the focal point of the adversary's attack. Thus, the user considers the client 104 as potentially untrustworthy (although, in actuality, the client 104 may be trustworthy and not under the influence of any adversary). By contrast, user considers the server 102 and the device 106 as relatively secure.

The sever 102 is considered secure (or at least more secure than the client 104) because it can be expected to maintain appropriate safeguards which prevent adversaries from gaining access to its services. For example, the server 102 can employs a conventional certificate-based public key infrastructure (PKI) method to identify and authenticate itself to arbitrary client devices who want to access the server 102. The device 106 is considered secure (or at least more secure than the client 104) because it is under the control of the user. Further, if the device 106 is implemented as a cellular telephone or the like, much of the core software (e.g., the operating system) of the device 106 is under the control of the service provider; it is therefore more difficult for an adversary to gain access to this type of resource or even learn of the details (e.g., as provided in a SDK) of this type of resource.

The adversary may mount an attack on the client 104 in different ways. Without limitation, for example, the adversary may attempt to discover leaked personal information when the user logs onto the server 102. Such leaked information can include (but is not limited to) the user's secret login credentials. Generally, the user's personal information can be compromised in various ways. For example, the adversary may install a key-logging application or other malware on the client 104 which intercepts the personal information. Alternatively, or in addition, the adversary can mount a "sniffing" attack by attempting to intercept the user's personal information by being in close proximity to the client 104 and passively monitoring the information being communicated over a wireless connection (or other type of connection) to the client 104. Alternatively, or in addition, the adversary can simply attempt to eavesdrop on the transaction, e.g., by making note of information that is displayed by the client 104 in the course of performing the transaction. Indeed, the adversary may represent the operator of the client 104 itself (e.g., a cashier who operates a sales terminal in a store); this type of adversary can write down or otherwise record personal information associated the user during a transaction, which the adversary can later exploit to the detriment of the user.

Alternatively, or in addition, an adversary can employ various methods to trick the user into revealing his or her personal information. For example, the adversary can mount a phishing type of attack to acquire the user's personal information by fraudulently masquerading as a legitimate entity. Alternatively, or in addition, the adversary can mount a spoofing attack by generating a fraudulent login screen or other mock page, through which the adversary attempts to solicit personal information. This is a non-exhaustive list of techniques that an adversary can employ to obtain personal information. Alternatively, or in addition, the adversary may attempt to cause damage to the computing resources of the system 100, e.g., by installing viruses or the like on client 104, etc.

One reason that the client 104 is considered potentially untrustworthy is because the client 104 is more accessible to the adversary than other components of the system 100. For example, the client 104 may represent a terminal in a store, a computer in a public location (such as an Internet café, a public library, or a hotel business center, etc.). Or the client 104 may represent a computer that is borrowed from another person, and so on.

One objective of the system 100 is to reduce the risk of the above-described attacks by the adversary. Another objective is to reduce the risks while presenting a user-friendly protocol. The following description sets forth the mechanisms by which the system accomplishes these objectives. Section B sets forth additional details regarding illustrative protocols that can be used by the system 100.

By way of overview, the system 100 uses the trusted device 106 (which is in the control of a user) to facilitate the user's remote log-in to a pre-established account on the secure server 102, but via the untrustworthy client 104. To ameliorate the risk posed by the untrustworthy client 104, the system 100 establishes a first secure connection 122 between the client 104 and server 102. Then, the system 100 establishes a second secure connection 124 between the trusted device 106 and the server 102. The second secure connection 124 is tunneled within the first secure connection 122. Then, the user uses the trusted device 106 to log into the server 102 via a log-in procedure, conducted using the tunneled second secure connection 124. Once the user has been positively identified and authenticated by the server 102, the user is permitted to gain access the to the server information 108 and conduct his or her transaction.

By virtue of the use of the tunneled second secure connection 124, the user can interact with the server 102 without the client 104 gaining access to personal information, at least in a discoverable form (e.g., a plain text form). This prevents the user's login credentials (and other personal information) from being leaked to the adversary.

Moreover, anyone wishing to access a user account on the server 102 is expected to be in control of the trusted device 106 (because successful authentication depends, in part, on the presentation of a correct device identification (ID) code, as will be described in Section B). Further, that person is expected to know relevant log-in credentials for that account. Thus, even if the adversary comes into physical possession of the device 106, the adversary will generally not know the secret credentials. This means that the adversary cannot gain access to the user's account. Alternatively, suppose that the adversary somehow obtains the user's credentials. Unless the adversary also has the physical device 106, the adversary cannot gain access to the user's account.

The system 100 can also eliminate or otherwise reduce the use of physical credit cards and the like. This is because the user can identify himself or herself using the device 106 in lieu of a credit card. That is, the user is no longer asked to present a physical credit card to the distrusted client 104 (or its untrustworthy operator). This reduces the risk that the user's credit card number will be "stolen" by a human or automated adversary. This also allows the user to reduce the number of physical cards in his or her possession.

As said, a second goal of the system is user-friendliness. The elimination of credit cards is one component that fosters user-friendliness. The system 100 can further promote this objective by facilitating the way in which the device 106 can establish a pairing relationship with the client 104. In one implementation, the address of the client 104 is presented in a device-readable form. FIG. 1 generally depicts the address presented in such a form as feature 126. The device 106 (or other agent) reads and interprets the address and then establishes a pairing relationship with the device 106 and client 104 based on that address. To perform this function, the device communication module 118 (provided by the device 106) includes a client address-reading module 128.

Figure 2:
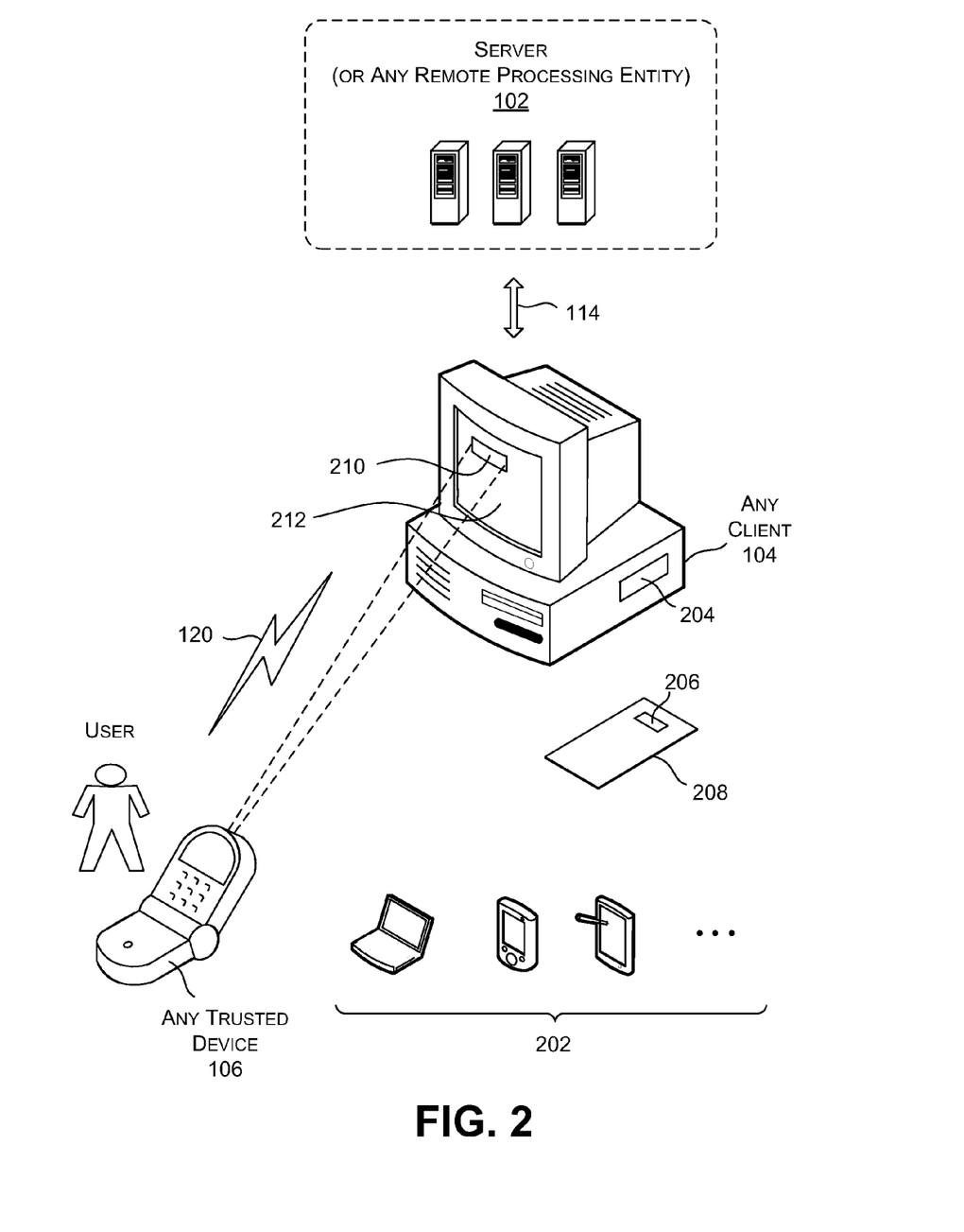
FIG. 2 shows an illustrative connection mechanism for establishing a pairing relationship between a device and a client, for use within the system of FIG. 1, or within any other type of environment.

Advancing to FIG. 2, this figure shows additional details regarding one implementation of the above-summarized pairing mechanism. FIG. 2 depicts the above-described client 104 as a terminal, a personal computer, or any other computing device. The client 104 is in communication with the server 102 (or any other remote processing entity) using any type of connection (such as a wide area network 114). The client 104 is also connectable to a device 106 via the short-field communication channel 120, which may comprise a wired or wireless channel of any kind. FIG. 2 depicts the user device 106 as a cell phone or the like. But any other devices 202 can be used to interact with the client 104. Assume that, in this exemplary scenario, the user is using a cell phone to interact with the client 104.

The client 104 presents its address in a form that can be read by the device 106. For example, in one case, the client 104 can present the address as a physical label. For example, the client 104 can include a label 204 which is affixed to, printed on, or otherwise associated with the physical housing of the client 104. Alternatively, or in addition, the client 104 can include a label 206 that is presented on an article 208 that is associated with the client 104, such as a print-out, a sales counter, a gas pump, a kiosk, a pedestal, a gate, etc. Alternatively, or in addition, the client 104 can display a label 210 on a display interface 212 of the client 104. This last implementation is particularly appropriate when the address of the client 104 can be expected to change over time. In short, no limitation is placed on the placement of the label with respect to the client 104.

The label itself can take any form or combination of forms. In one case, the label can provide address information in bar code form of any type (e.g., one-dimensional, two-dimensional, mono-color, multi-color, etc.). Alternatively, or in addition, the label can provide characters that are readable by optical character recognition (OCR) functionality or the like. Alternatively, or in addition, the label can provide the address information in magnetic form that is readable by a magnetic reading apparatus. Alternatively, or in addition, the label can provide the address information in optical form (e.g., as lands and pits) that is readable by a laser or other optical reading mechanism. Alternatively, or in addition, an RF ID (or other electromagnetic transducer functionality or the like) can be used to encode the address information. In short, no limitation is placed on the manner of representing the address of the client 104 in a physical device-readable form.

Presume, in a first example, that a label presents the address of the client 104 in a bar code form or in an OCR form. The client address-reading module 128 of the device 106 can use a built-in camera (not shown) to take a digital image of the label. The client address-reading module 128 can then analyze the captured image to extract and interpret (e.g., decode) the address information, e.g., by converting detected bar code information into alphanumeric characters representing the address of the client 104. The device 106 then uses the interpreted address to establish a connection with the client 104, e.g., by communicating with the client 104 at the determined address and engaging in any type of pairing protocol.

From the end-user's perspective, the user simply approaches the client 104 and takes a picture of the address-bearing label. The device 106 then automatically (or at least semi-automatically) connects to the client 104. This reduces the amount of manual and burdensome configuration that the user is (otherwise) asked to perform to connect to the client 104.

The environment shown in FIG. 1 is one application of the approach illustrated in FIG. 2. There are other applications. Generally, a user can apply the approach shown in FIG. 2 to gain access to any service of any kind, with or without eventual interaction with a remote server. To name one example, a client can control access to a physical facility. A user can use his or her device to read an address associated with the client, e.g., as printed on a gate or doorway that restricts access to the facility. The device forms a pairing relationship with the client based on the address that has been read, followed by any kind of authentication procedure implemented by the client, the sever, and/or some other agent. Based on the outcome of the procedure, the client (or some other actor) either allows or disallows the user to gain access to the physical facility.

B. Illustrative Processes

FIGS. 3-6 explain the principles underlying the operation of the system 100 (of FIG. 1), or other type of system, in flowchart form. Since the principles underlying the operation of the system 100 have already been described in Section A, certain operations will be addressed in summary fashion in this section.

Figure 3:
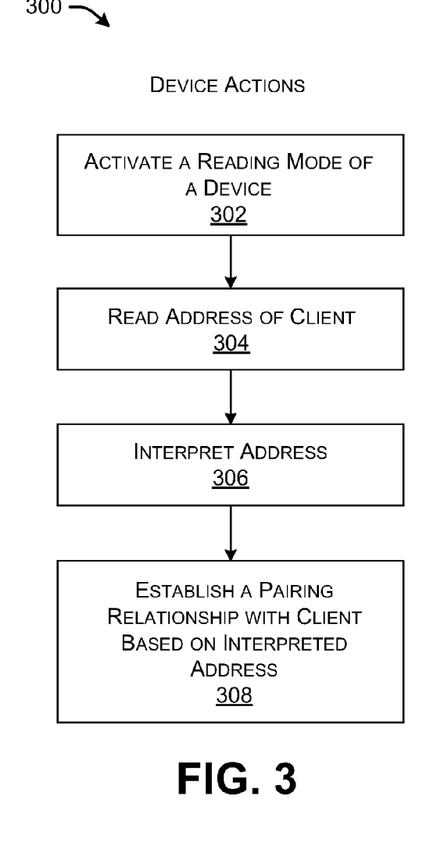
FIG. 3 shows an illustrative method by which a device can establish a pairing relationship with a client using the connection mechanism of FIG. 2, from the "perspective" of the device.

FIG. 3 shows a procedure 300 for pairing the any device 106 with any client 104, from the perspective of the device 106. In block 302, the device 106 activates a reading mode of the device 106. For example, if the address is printed as a bar code, OCR information, etc., the device 106 may activate picture-taking mode. In block 304, the device 106 reads the address. In block 306, the device 106 interprets (e.g., decodes) the address that has been read. In block 308, the device 106 establishes a pairing relationship with the client 104 based on the address that has been read and interpreted.

Figure 4:
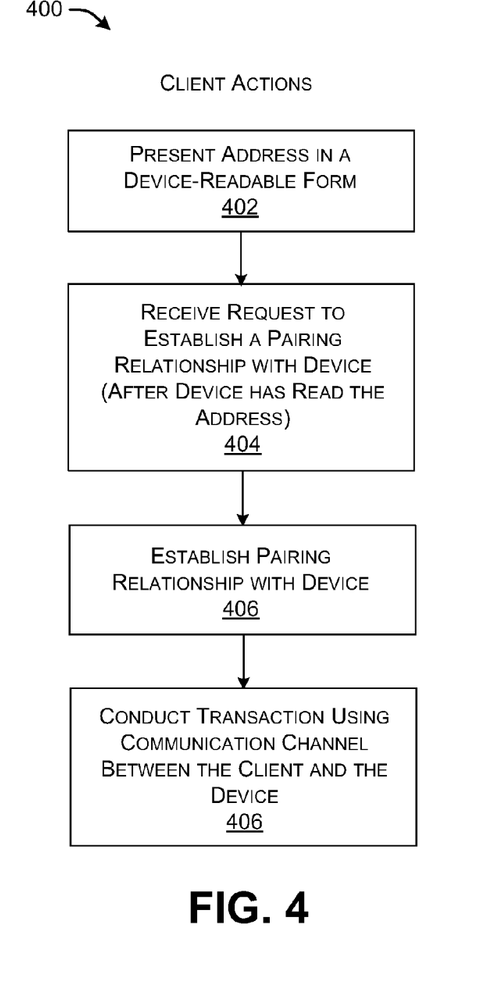
FIG. 4 shows an illustrative method by which a client can establish a pairing relationship with a device using the connection mechanism of FIG. 2, from the "perspective" of the client.

FIG. 4 shows a complementary procedure 400 for pairing any device 106 with any client 104, from the perspective of the client 104. In block 402, some agent associated with the client 104 presents the address of client 104 in a device-readable form. In block 404, after the device 106 reads the address, the client 104 receives a request from the device 106 to establish a pairing relationship, e.g., via some pairing protocol. In block 406, the client 104 establishes a pairing relationship with the device 106. In block 408, the client 104 participates in a transaction using a communication channel 120 between the device 106 and the client 104.

Figure 5:
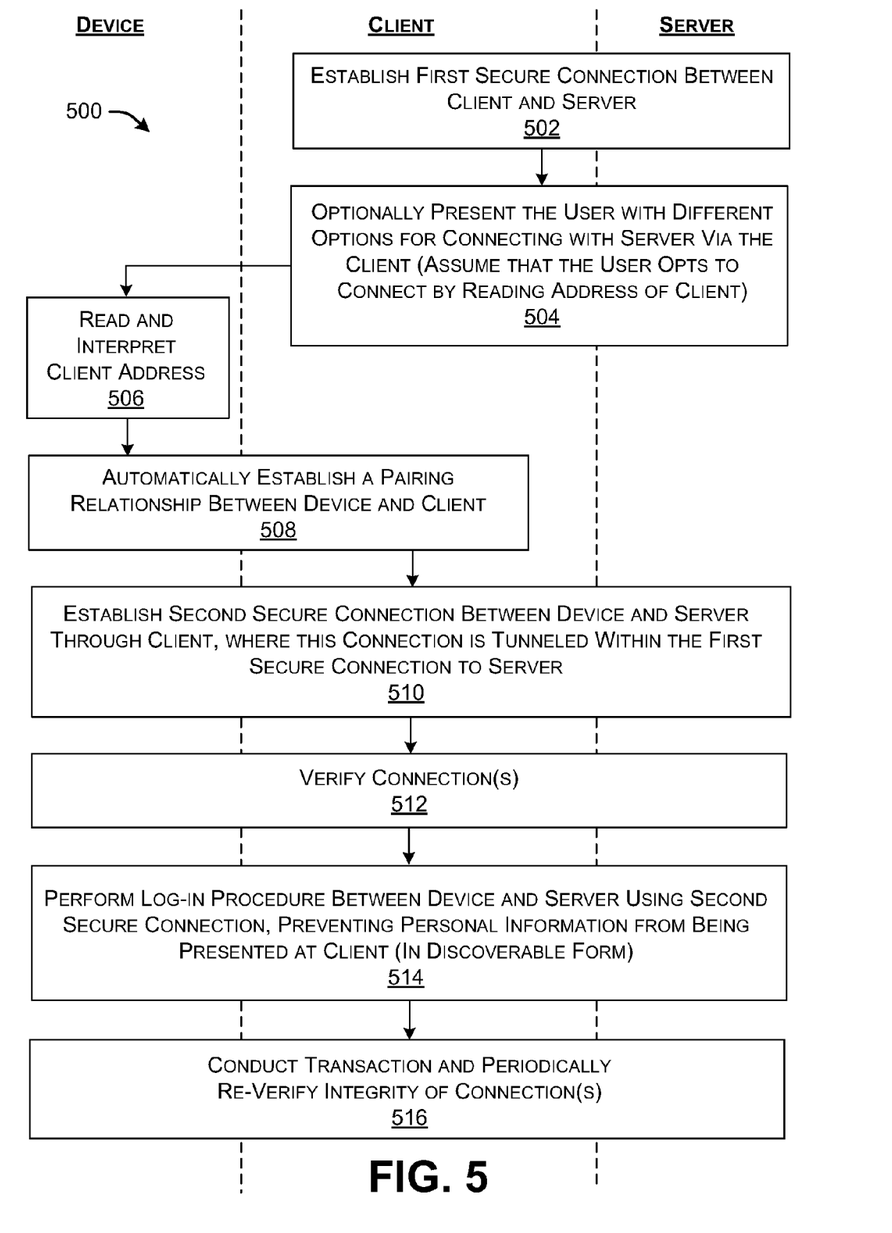
FIG. 5 shows an illustrative procedure that sets forth one manner of performing a transaction (involving a log-in procedure), e.g., using the system shown in FIG. 1.

FIG. 5 shows a procedure 500 for carrying out a transaction using the system 100 of FIG. 1, which includes a server 102, a device 106, and an untrustworthy client 104. A significant portion of the procedure 500 involves a log-in procedure, whereby the user (who is operating the device 106) requests the right to access the server 102 via the client 104. If the authentication succeeds, the user is allowed to interact with the services provided by the server 102 to perform a transaction of any kind. The procedure 500 incorporates the types of connection mechanism shown in FIGS. 3 and 4, as one part thereof.

In block 502, the client 104 and server 102 establish the first secure connection 122 between themselves. This secure connection 122 is physically implemented over the network 114 that connects the client 104 and server 102. In one implementation, block 502 may involve using a conventional Transport Layer Security (TLS) protocol to establish the first secure connection 122, or any other suitable secure protocol (such as SSL). An established TLS session assumes a successful symmetric key exchange. The exchanged master secret, $K_{sc}$, is used for encrypted communication between the server 102 and the client 104. In one version, the formation of the first secure connection 122 involves just the authentication of the server 102 by the client 104; that is, it is not necessary for the server 102 to authenticate the client 104.

In block 504, the server 102 may give the user the option of connecting to the server 102 using different modes. In one mode, the server 102 can invite the user to directly use the client 104 to log onto the server 102 (e.g., without the safeguards described herein). In another mode, the server 102 can invite the user to log onto the server 102 via the device 106. In one sub-mode of this second option, the server 102 can invite the user to read the address of the client 104 in the manner described above (e.g., using the connection mechanism illustrated in FIGS. 2-4). In another sub-mode of this option, the server 102 can invite the user to manually input the address of the client 104. The server 102 can convey these options to the user via a display provided by the client 104 (not shown). Assume that the user selects the last mode; namely, the user chooses to log onto to the server 102 via the device 106 by first reading the address of the client 104 that is presented in device-readable form.

In block 506, the user uses the device 106 to read and interpret the address of the client 104. In block 508, the device 106 forms a pairing relationship with the client 104 using the address that it determined in block 506.

In block 510, the device 106 and server 102 establish the second secure connection 124 through the client 104. This second secure connection 124 is tunneled within the first secure connection 122 using a conventional tunneling protocol. In one implementation, block 510 may involve using the TLS protocol to establish the second secure connection 124, or any other appropriate secure protocol (such as SSL). Assume, for example, that a first TLS session is used to handle the first secure connection 122 (associated with a secret key $K_{sc}$) and a second TLS session is used to handle the second secure connection 124 (associated with a secret key $K_{ds}$). This means that information transmitted between the device 106 and the server 102 is encrypted using $K_{ds}$; this cipher text is additionally encrypted with $K_{sc}$ on its way from the client 104 to the server 102. In one version, the formation of the second secure connection 124 involves just the authentication of the server 102 by the device 106; that is, it is not necessary for the server 102 to authenticate the device 106.

In block 512, the connections established above are verified in order to make sure that the physical device 106 in the user's control is connected to the desired physical client 104. Additional information regarding this action will be provided below. This pairing verification is useful in those circumstances in which the communication channel 120 that is employed cannot guarantee that the device 106 is paired to the desired physical client 104 (e.g., in a Bluetooth scenario or the like). In such situations, it is possible for a malicious party to spoof the aforementioned pairing process and pair the device 106 to a malicious client (not shown) without the user's knowledge.

In block 514, the device 106 and the server 102 then interact with each other to conduct a log-in procedure. For example, the server 102 can transmit a log-in prompt message to the device 106 over the second secure connection 124. In one case, this message may ask the user to enter his or her secret login credentials. The device 106 then receives this message and displays it to the user via a user interface of the device 106. The message may include fields for the user to enter his or her login credentials, such as a user name and password.

The device 106 then transmits the credentials to the server 102 via second secure connection 124, along with, optionally, a device ID code. The device ID code identifies the device 106 that the user is using to gain access to the server 102. In one case, the device ID code can be stored in the device 106 at the time of manufacture. In another case, the device ID code can be stored by the device 106 during a registration process or the like, e.g., when the user registers with the server 102 or some other entity to establish an account. Still other ways of providing the device ID are possible. The credentials and user ID are generically referred to as authentication information. Insofar as the server 102 collects and acts on multiple pieces of authentication information, it can be considered as employing a multi-factor authentication technique. Still other types of authentication information can be used, such as a biometric template associated with the user, etc.

The server 102 then receives the authentication information. The server 102 compares the authentication information with pre-stored information associated with the user's account. In the event of a positive match, the server 102 establishes a log-in session between the server 102 and the client 104, upon which the client 104 is permitted to access the server information 108 which pertains to the user's account. Generally, the server 102 can use any log-in protocol to conduct the log-in procedure, such as the Secure Remote Password (SRP) protocol, any type of challenge/response scheme, etc.

In the course of this log-in procedure, the user's personal information is not displayed by the client 104 in any discoverable form. For example, the client 104 does not display personal information as plain text.

Presume that the log-in procedure succeeds. If so, in block 516, the user is permitted to conduct a transaction with the server 102 via the second secure connection 124. In the course of this transaction, the server 102 may also present information on the client 104 for display to the user (e.g., because the client 104 may have a larger display surface than the portable device 106). To prevent the adversary from intercepting personal information, the server 102 can "anonymize" sensitive information that it sends to the client 104. For example, if the server 102 displays account information, it can display only a certain number of terminal digits of the account information, e.g., by replacing the other digits with asterisks or the like.

In block 516, the server 102 can periodically verify the integrity of its connection to the device 106. According to one implementation, the server 102 can perform this task by pinging the device 106 over the second secure connection 124 at a prescribed interval in order to verify that the device 106 is still connected to the client 104. Whenever the server 102 fails to receive the device's ping response within a prescribed timeframe, the server 102 can close the log-in session with the client 104. This routine pinging of the device 106 by the server 102 prevents the adversary from accessing information on the server 102 when the device 106 loses power or the device's connection to the client 104 is lost for some other reason.

In another optional implementation, the pinging is implemented as a request from the server 102 to the device 106 for the device 106 to increment a counter. The initial value of the counter is set by the server 102 to a large random number which is transmitted to the device 106 when the server 102 completes the second secure connection 124 thereto. Then each time the device 106 receives a request from the server 102 over the second secure connection 124 to increment the counter, the device 106 increments the counter and transmits the incremented count to the server 102 over the second secure connection 124. Upon receiving this count, the server 102 compares it to the count it expects to receive based on the count it last received from the device 106.

Finally, the device 106 can terminate its session with the server 102 by sending an express log-off signal to the server 102 using the second secure connection 124. The user can also terminate the session in the manner described above, e.g., by simply moving away from the client 104 with his or her device 106.

Additional information will now be provided regarding selected actions in FIG. 5. As to block 512, there are numerous ways to verify the device's connection to the client 104. In a first approach, the device 106 beings the verification process by generating a large random number. The device 106 then displays the generated number to the user via its user interface; the device 106 then transmits the generated number to the server 102 over the second secure connection 124. The user then reads the generated number displayed on the device 106 and enters it into the user interface of the client 104. The client 104 then transmits the entered number to the server 102 over the first secure connection 122. The server 102 then receives the generated number transmitted from the device 106 and the entered number transmitted from the client 104, and compares these two received numbers. The server 102 then transmits a comparison result message to the device 106 over the second secure connection 124; this message specifies whether or not the generated number transmitted from the device 106 matches the entered number transmitted from the client 104. The device 106 receives the comparison result message and displays it to the user via the user interface of the device 106.

If the message displayed on the device 106 indicates that the server 102 successfully matched the two numbers, this tells the user that the physical device 106 in their control is connected to the desired physical client 104 they are working at, and they can continue to use the client 104 to log into the server 102. However, if the message displayed on the device 106 indicates that the server 102 did not successfully match the two numbers, this tells the user that the physical device 106 in his or her control is not connected to the desired physical client 104 that they are working at, and they should cease working on the client 104.

In a second verification approach, the device 106 again begins the process by generating a large random number. The device 106 then displays the random number to the user via its user interface; it also transmits this random number to the server 102 over the second secure connection. The server 102 then receives the random number transmitted from the device 106 and transmits it to the client 104 over the first secure connection 122. The client 104 receives the random number transmitted from the server 102 and displays it to the user via the user interface of the client 104 along with a prompt that asks the user to visually compare the number displayed on the user interface of the client 104 to the number displayed on the user interface of the device 106. The user then visually compares the two displayed numbers and enters the result of their comparison into the user interface of the client 104. The client 104 then transmits a comparison result message to the server 102 over the first secure connection 122, which the server 102 then receives; this message specifies whether or not the number displayed on the user interface of the client 104 matches the number displayed on the user interface of the device 106. The client 104 also transmits the comparison result message to the device 106 over the communication channel 120, which the device 106 then receives and displays to the user via the user interface of the device 106.

If the message displayed on the device 106 indicates that the number displayed on the user interface of the client 104 matches the number displayed on the user interface of the device 106, this tells the user that the physical device 106 in their control is connected to the desired physical client 104 they are working at, and they can continue to use the client 104 to log-in to the server 102. If the message displayed on the device 106 indicates that the number displayed on the user interface of the client 104 does not match the number displayed on the user interface of the device 106, this tells the user that the physical device 106 in their control is not connected to the desired physical client 104 they are working at, and they should cease working on the client 104.

In a third verification approach, the server 102 begins the process by transmitting a small animation to the client 104 over the first secure connection 122. In one implementation, this animation can include any type of game that employs animation. The client 104 receives the animation and displays it to the user via the user interface of the client 104. The user then enters animation control commands into the user interface of the device 106. The entered animation control commands are then transmitted from the device 106 to the server 102 over the second secure connection 124. The server 102 then receives the entered animation control commands, updates the animation accordingly based on the received commands, and transmits the updated animation to the client 104 over the first secure connection 122. The client 104 then receives the updated animation and displays it to the user via the user interface of the client 104. The user then visually compares the animation control commands that they entered into the user interface of the device 106 to the updated animation displayed on the client 104 in order to determine if their control commands match the updated animation.

If the user's control commands match the updated animation, this tells the user that the physical device 106 in their control is connected to the desired physical client 104 they are working at, and they can continue to use the client 104 to login to the server 102. If the user's control commands do not match the updated animation, this tells the user that the physical device 106 in their control is not connected to the desired physical client 104 they are working at, and they should cease working on the client 104. The user then enters the result of their visual comparison (i.e., whether or not their entered control commands match the updated animation) into the user interface of the device 106. The device 106 then transmits a user comparison result message to the server 102 over the second secure connection 124; this message specifies whether or not the user's entered control commands match the updated animation. The server 102 then receives the user comparison result message.

Block 516 can employ various safeguards to minimize the risk that sensitive information is compromised in the course of the transaction. For example, at least a subset of data writes to the server 102 which are initiated by the client 104 can be verified at the device 106 in the following manner. For example, whenever the server 102 receives a data write request from the client 104 over the first secure connection 122, the server 102 can transmit a message to the device 106 over the second secure connection 124, requesting that the user explicitly approve the data write via the user interface of the device 106. The device 106 then receives this message and displays it to the user on the user interface of the device 106. Upon the user's entry of their approval of the data write into the user interface of the device 106, the device 106 can transmit a data write approval message to the server 102 over the second secure connection 124. The server 102 receives the data write approval message and allows the data write to proceed. Exemplary data writes for which this verification may be deemed appropriate include money transfers, stock transactions, bill payments, etc. This verification of data writes to the server 102 provides security protection against the situation in which the adversary gains control of the client 104 and initiates an automated attempt to access the server's information services.

According to another safeguard, the user can request that particular pages (or parts of pages) received from the server 102 over the first secure connection 122 be forwarded by the server 102 to the device 106 over the second secure connection 124 for content verification by the user. For example, these content verification requests can be handled by an AJAX (asynchronous JavaScript and Extensible Markup Language) script which is implemented within the pages. This feature addresses the situation in which the client 104 is being controlled by a malicious "ghost" user interface application which can trick the user into performing an undesirable action on the client 104 by displaying false information to the user on the user interface of the client 104 (e.g., displaying a false stock price, displaying a false message indicating that a credit card transaction is required, and the like).

According to another safeguard, the server 102 can employ a conventional human interactive proofs (HIPs) method to verify each "potentially suspect" action initiated by the client 104 on the server 102. Examples of such suspect actions include money transfers, stock transactions, bill payments and the like. The HIPs can be transmitted from the server 102 over the first secure connection 122 to the client 104, and also over the second secure connection 124 to the device 106. The HIPs can then be displayed on the user interface of both the client 104 and the device 106. The user can then enter an appropriate response to the HIPs into the user interface of both the client 104 and device 106. The user's entered HIPs response is transmitted from the client 104 over the first secure connection 122 to the server 102 and from the device 106 over the second secure connection 124 to the server 102. The server 102 receives both HIPs responses, and, if they are correct, allows the suspect action to be completed. This HIPs verification of suspect actions on the server 102 also provides security protection against the situation in which the adversary gains control of the client 104 and initiates an automated attempt to access the server's information services.

Figure 6:
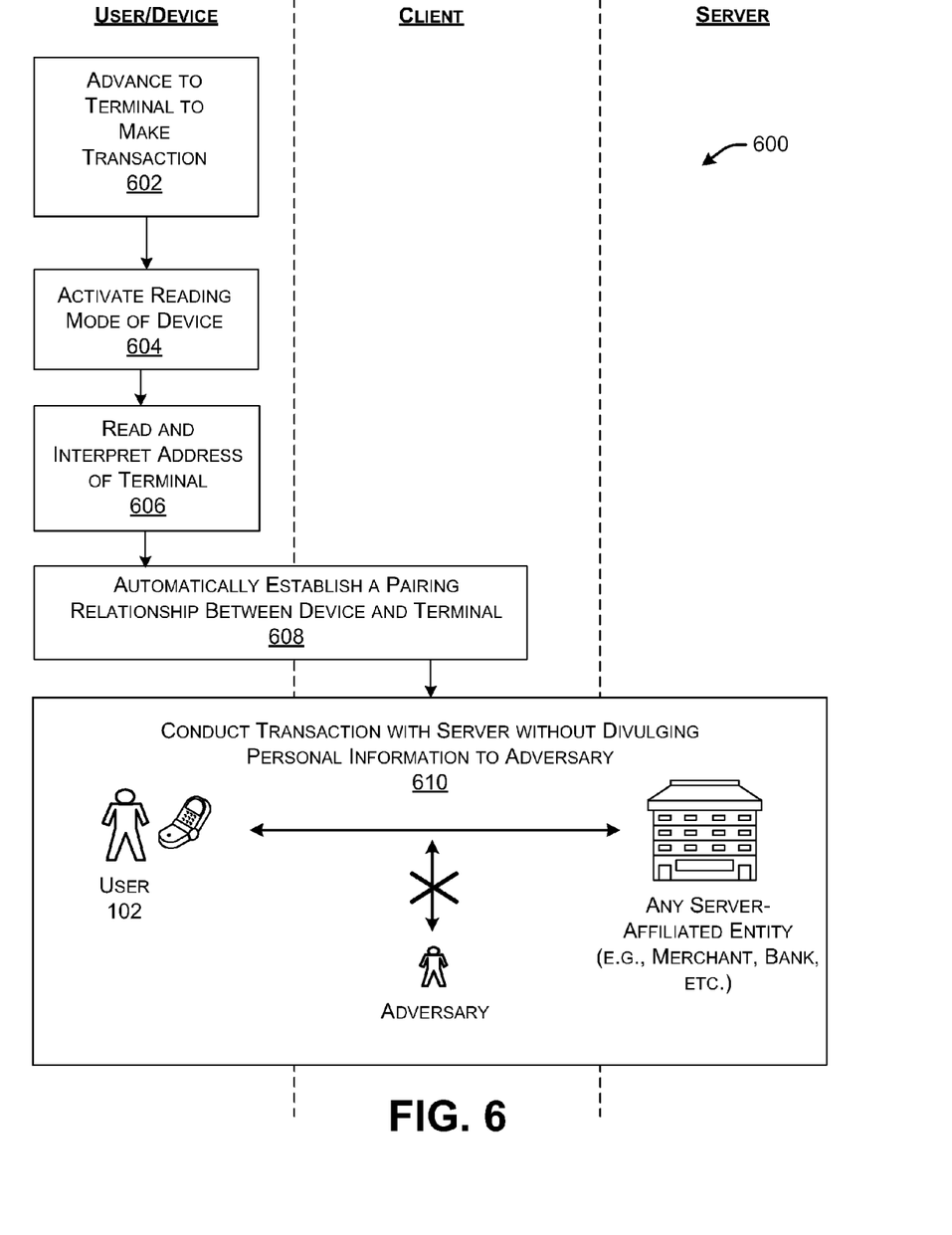
FIG. 6 shows an application of the procedure of FIG. 5 to a scenario in which a user performs a financial transaction, such as a purchase.

FIG. 6 shows a procedure 600 in which the operations of FIG. 5 are applied to any type of financial transaction, such as the purchase of any type of goods or services. For example, the procedure 600 can take place in a brick-and-mortar-type store, a gas station, a kiosk, a home setting using a personal computer, and so on.

In block 602, the user selects an article to purchase and advances to a terminal to make the purchase. Here, the terminal constitutes the above-described client 104. In block 604, the user activates the reading mode of the device 106. In block 606, the user uses the device 106 to read the address of the terminal. In block 608, the terminal and the device 106 establish a pairing relationship. The device 106 and the server 102 then establish the above-described tunneled second secure connection 124. In block 610, the user conducts his or her transaction using the device 106 (which may involve a log-in procedure). Since personal information is not displayed by the terminal, the adversary cannot readily discover the personal information.

Figure 7:
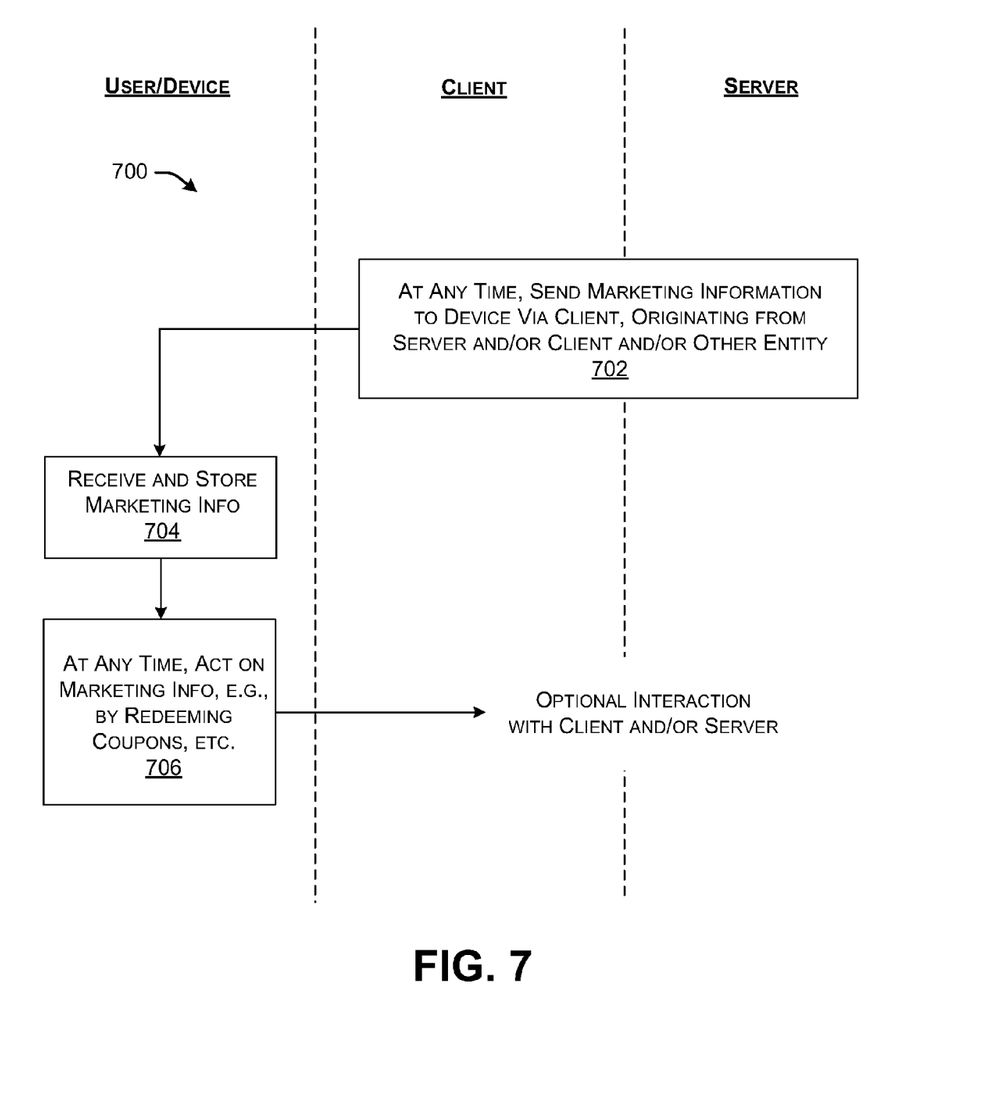
FIG. 7 shows an illustrative procedure for forwarding information (such as marketing information) to the device via the client.

FIG. 7 shows a procedure 700 for sending any type of information to the device 106 via the architecture shown in FIG. 1, with or without the automatic pairing mechanism described above. For example, the information can correspond to marketing information that serves any marketing objective in any context. For example, the marketing information may correspond to electronic coupons (including offers and promotions of any type), advertisements, product reviews, electronic payments, and so on.

In block 702, any source can forward the information to the user device 106 via the client 104. The original source of the information may correspond to any entity, such as a merchant of any kind. In the context of FIG. 1, the original source may correspond to the server 102, the client 104, and/or some other entity (or plural entities). In one implementation, the client 104 can transfer the information to the device 106 via the second secure connection 124, e.g., over the wireless or wired communication channel 120. This reduces the risk that the adversary can intercept or corrupt the information.

Block 702 involves transferring the information to the device 106 at any time. In one case, the client 104 transfers the information to the device 106 after the device 106 has established the second secure connection 124. In one case, the client 104 can use a push technique to forward the information to the device 106. For example, the client 104 can forward the information at the start of a transaction, at the end of a transaction, in the middle of a transaction (e.g., during an idle time in the transaction), etc. In another case, the client 104 can forward the information to the device 106 upon a triggering event. For example, the client 104 can forward the information to the device 106 when the user purchases a particular type of product or takes some other triggering action. In another case, the client 104 can forward the information upon request from the user who is operating the device 106 (e.g., using a pull technique). No limitation is placed on the timing at which the client 104 transfers the information to the device 106.

Block 702 also involves selecting the content of the information based on any factor or any combination of factors. In one case, an appropriate deciding entity (e.g., as implemented by the server 102 or any other agent) determines what information to send to the device 106 based on any combination of: the user's characteristics (e.g., age, location, gender, interests, etc.); the user's present transaction history (e.g., within a current session); the user's past transaction history, and so on. The deciding entity can also base its decision on an analysis of a population of users, such as a population of users that is deemed to be similar to the user. The deciding entity can also base its decision on the objectives of the merchant (or other provider of the information). For example, a merchant may wish to promote a certain product regardless of whether this product is deemed suitable for a particular user. Still other factors can be used to select information to send to the device 106.

The user can expressly opt in or opt out of the above-described information-forwarding service. If the user opts in, the user can control the factors that the deciding entity uses to send information to the device 106. The system 100 takes appropriate safeguards to ensure the privacy of any personal data associated with the users.

In block 704, the device 106 can receive and store the information. In block 706, the user, operating the device 106, can act on the information. In one case, the user can redeem a coupon that has been forwarded to the user. The user can perform this action while connected to the client 104 via the second secure connection 124. In this case, the user can forward the coupon to the server 102 (or any other destination) via the client 104. Alternatively, or in addition, the user may take action on the information outside the context of the system 100 of FIG. 1. For example, the user can print out a coupon and present it to a merchant in conventional fashion.

In general, the device 106 can function in a manner akin to a digital wallet. The user may find this functionality beneficial because it provides a paperless way of conducting transactions, such as collecting and redeeming coupons, etc. The convenience of this approach is particularly pronounced in those cases in which the device 106 is implemented by modifying commonly-used equipment that the user already carries with him or her, such as when the device 106 is implemented by modifying a cell phone, a PDA, etc. A merchant may find this functionality beneficial because it provides a targeted and efficient way to send marketing information to users.

C. Representative Processing Functionality

FIG. 8 sets forth illustrative electrical data processing functionality 800 that can be used to implement any aspect of the functions described above. With reference to FIG. 1, for instance, the type of processing functionality 800 shown in FIG. 8 can be used to implement any aspect of the server 102, the client 104, and/or the device 106. In one case, the processing functionality 800 may correspond to any type of computing device that includes one or more processing devices.

The processing functionality 800 can include volatile and non-volatile memory, such as RAM 802 and ROM 804, as well as one or more processing devices 806. The processing functionality 800 also optionally includes various media devices 808, such as a hard disk module, an optical disk module, and so forth. The processing functionality 800 can perform various operations identified above when the processing device(s) 806 executes instructions that are maintained by memory (e.g., RAM 802, ROM 804, or elsewhere). More generally, instructions and other information can be stored on any computer readable medium 810, including, but not limited to, static memory storage devices, magnetic storage devices, optical storage devices, and so on. The term computer readable medium also encompasses plural storage devices.

The processing functionality 800 also includes an input/output module 812 for receiving various inputs from a user (via input modules 814), and for providing various outputs to the user (via output modules). One particular output mechanism may include a presentation module 816 and an associated graphical user interface (GUI) 818. The processing functionality 800 can also include one or more network interfaces 820 for exchanging data with other devices via one or more communication conduits 822. One or more communication buses 824 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for pairing a device with a client and performing a log-in procedure, comprising:
   providing an address of the client in a physical device-readable form;
   establishing a first secure connection between the client and a server, the client communicating with the server over a network;
   establishing a pairing relationship between the client and the device in response to reading of the address by the device;
   establishing a second secure connection between the device and the server through the client, based on the pairing relationship established between the device and the client, the second secure connection being tunneled within the first secure connection; and
   performing a log-in procedure over the second secure connection, enabling a user to gain access to a service provided by the server upon a successful outcome of the log-in procedure.

2. The computer-implemented method of claim 1, wherein the device-readable form is a bar code form.

3. The computer-implemented method of claim 1, wherein the device-readable form comprises an encoding of the address using an electromagnetic transponder.

4. The computer-implemented method of claim 1, wherein the device-readable form comprises a label placed in proximity to the client.

5. The computer-implemented method of claim 4, wherein the label is provided on a housing of the client or on an article associated with the client.

6. The computer-implemented method of claim 4, wherein the label is displayed on a display interface of the client.

7. The computer-implemented method of claim 1, wherein the device communicates with the client via a wireless communication channel.

8. The computer-implemented method of claim 1, wherein the device is a mobile telephone.

9. The computer-implemented method of claim 1, wherein the device is a portable computing device.

10. The computer-implemented method of claim 1, wherein the client is a terminal.

11. The computer-implemented method of claim 1, further comprising, following the log-in procedure, conducting a financial transaction involving a purchase.

12. The computer-implemented method of claim 1, further comprising sending marketing information to the device.

13. The computer-implemented method of claim 12, wherein the marketing information comprises an electronic coupon or an advertisement.

14. The computer-implemented method of claim 1, wherein the log-in procedure involves receiving user credentials and a device identification code over the second secure connection.

15. A computer-implemented method for conducting a transaction in a merchandising environment, comprising:
providing an address of the client in a physical device-readable form;
establishing a first secure connection between the client and a server, the client communicating with the server over a network;
establishing a pairing relationship between the client and the device in response to reading of the address by the device;
establishing a second secure connection between the device and the server through the client, based on the pairing relationship established between the device and the client, the second secure connection being tunneled within the first secure connection;
performing a log-in procedure over the second secure connection, enabling a user to gain access to a service provided by the server upon a successful outcome of the log-in procedure;
conducting a transaction over the second secure connection; and
sending marketing information to the device via the second secure connection in a course of the transaction,
the client representing an untrustworthy entity and the device representing a trusted entity.

16. The computer-implemented method of claim 15, wherein the log-in procedure involves receiving user credentials and a device identification code over the second secure connection.

17. The computer-implemented method of claim 15, wherein the merchandising environment is a store.

18. The computer-implemented method of claim 15, wherein the device is a mobile telephone.

19. A system for conducting a transaction with a portable device, comprising:
a client and server configured to establish a first secure connection between the client and the server, the client communicating with the server over a network;
the client and the server configured to enable communication between the portable device and the server via a second secure connection that is established between the portable device and the server, the second secure connection being tunneled within the first secure connection, based on obtaining an address of the client in a physical device-readable form, establishing a pairing relationship between the client and the portable device in response to reading of the address by the portable device, the second secure connection established based on the pairing relationship; and
the server and the client being configured to send marketing information to the portable device via the second secure connection in a course of a transaction conducted between the portable device and the server.

20. The system of claim 19, wherein the marketing information comprises an electronic coupon or an advertisement.

* * * * *